UNITED STATES PATENT OFFICE.

EDGAR JOSEPHSON, OF PASSAIC, NEW JERSEY, ASSIGNOR TO PANTASOTE LEATHER COMPANY, OF PASSAIC, NEW JERSEY, A CORPORATION OF NEW JERSEY.

PROCESS OF TREATING CELLULOID.

1,211,588. Specification of Letters Patent. Patented Jan. 9, 1917.

No Drawing. Application filed February 2, 1914, Serial No. 816,134. Renewed August 19, 1916. Serial No. 115,916.

*To all whom it may concern:*

Be it known that I, EDGAR JOSEPHSON, a citizen of the United States, and a resident of Passaic, Passaic county, State of New Jersey, have invented a new and useful Process of Treating Celluloid, of which the following is a specification.

My invention relates to the treatment of celluloid and like substances and has for its object the recovery of camphor and of nitrocellulose from such substances.

I have found that if celluloid is divided into small particles and then distilled in the presence of water, camphor contained in the celluloid will pass from the still, after which it may be solidified and collected, while the nitro-cellulose contained in the celluloid will remain in the still substantially undecomposed. The division of the celluloid into minute particles may be accomplished by grinding, as in a pebble mill, preferably in the presence of water. When so ground, the celluloid is in the form of a paste, more or less thin according to the amount of water present. My experiments indicate that the fineness of division of the celluloid is of very great importance, the yield of camphor being greater the more finely the celluloid is divided. The distillation of the celluloid in water may be accomplished in any suitable manner and with the aid of any suitable apparatus and the camphor passing off may be collected in any suitable manner.

A method of carrying on my process which I have found to give satisfactory results consists in first grinding the celluloid into powder, then placing the powder in a still in the presence of water and then passing steam into the water and conducting the steam and camphor issuing from the still through a suitable condenser into a receptacle. The steam and camphor are condensed in the condenser and are collected in the receptacle and the camphor and water are then separated in any desired manner. The nitro-cellulose remaining in the still is in such condition that it can be used as nitro-cellulose in the arts, being undecomposed and apparently unchanged in any way. Any pigment which may have been in the celluloid treated remains with the nitro-cellulose in the still but can readily be separated from the nitro-cellulose, as for example, by dissolving out the latter.

I claim:

1. The process of treating celluloid which consists in dividing the celluloid into a fine powder and then distilling camphor therefrom, substantially as and for the purpose described.

2. The process of treating celluloid which consists in contacting finely powdered celluloid with water and then distilling camphor from said celluloid, substantially as and for the purpose described.

3. The process of treating celluloid, which consists in contacting finely powdered celluloid with water and then distilling the camphor from said celluloid by means of a heated fluid, substantially as and for the purpose described.

4. The process of treating celluloid, which consists in dividing the celluloid into a fine powder and then distilling the camphor therefrom by means of steam, substantially as and for the purpose described.

5. The process of treating celluloid, which consists in placing a mass of finely powdered celluloid in a still, passing a current of steam into said mass, condensing the steam and camphor issuing from said still and separating said condensed camphor from said condensed steam, substantially as and for the purpose described.

In testimony whereof I have hereunto set my hand in the presence of two subscribing witnesses.

EDGAR JOSEPHSON.

Witnesses:
JOHN A. FERGUSON,
FRED A. KLEIN.